Feb. 26, 1963

J. W. BROWN ET AL 3,078,967

SHOCK STRUT WITH LINEAR DAMPER

Filed Aug. 15, 1960

INVENTOR.
JAMES W. BROWN
RAYMOND J. BLACK
BY
William S. Thompson
AGENT 3,078,967
SHOCK STRUT WITH LINEAR DAMPER
James W. Brown and Raymond J. Black, South Bend,
Ind., assignors to The Bendix Corporation, South
Bend, Ind., a corporation of Delaware
Filed Aug. 15, 1960, Ser. No. 49,566
4 Claims. (Cl. 188—96)

The present invention relates to a shock strut particularly adapted for use in a helicopter landing gear.

One of the problems facing the helicopter landing gear designer is that of ground resonance. Ground resonance is a phenomenon which can occur during either landing or take-off operation. It occurs when a slightly out-of-balance condition of the spinning rotor blade induces a pitching and rolling motion to the airframe on its wheels. Rotor unbalance can be aggravated by the blade drag hinges used on most rotor assemblies. Drag hinges are the couplings between the blades and the rotor shaft. At low speeds, the drag hinges can permit unequal spacing of the blades thus producing the out-of-balance conditions.

The kinetic energy of the pitching or rolling mass of the airframe is transferred to the landing gear. When this energy is transferred at a rate greater than the energy dissipating rate of the landing gear, a self-excited resonance can occur. There have been instances of catastrophic failure of major components of helicopters resulting from loadings imposed under these ground resonance conditions. Accordingly, it is an object of the present invention to provide a landing gear shock strut for helicopters having linear damper means for reducing ground resonance oscillation.

Another object of the present invention is to provide in combination with a shock strut of the variable orifice type and a metering pin for controlling the orifice area, a damping piston secured to the metering pin for damping low amplitude vibrations.

Other objects and features of the invention will become apparent from a consideration of the following description which proceeds with reference to the accompanying drawings, wherein.

Figure 1:
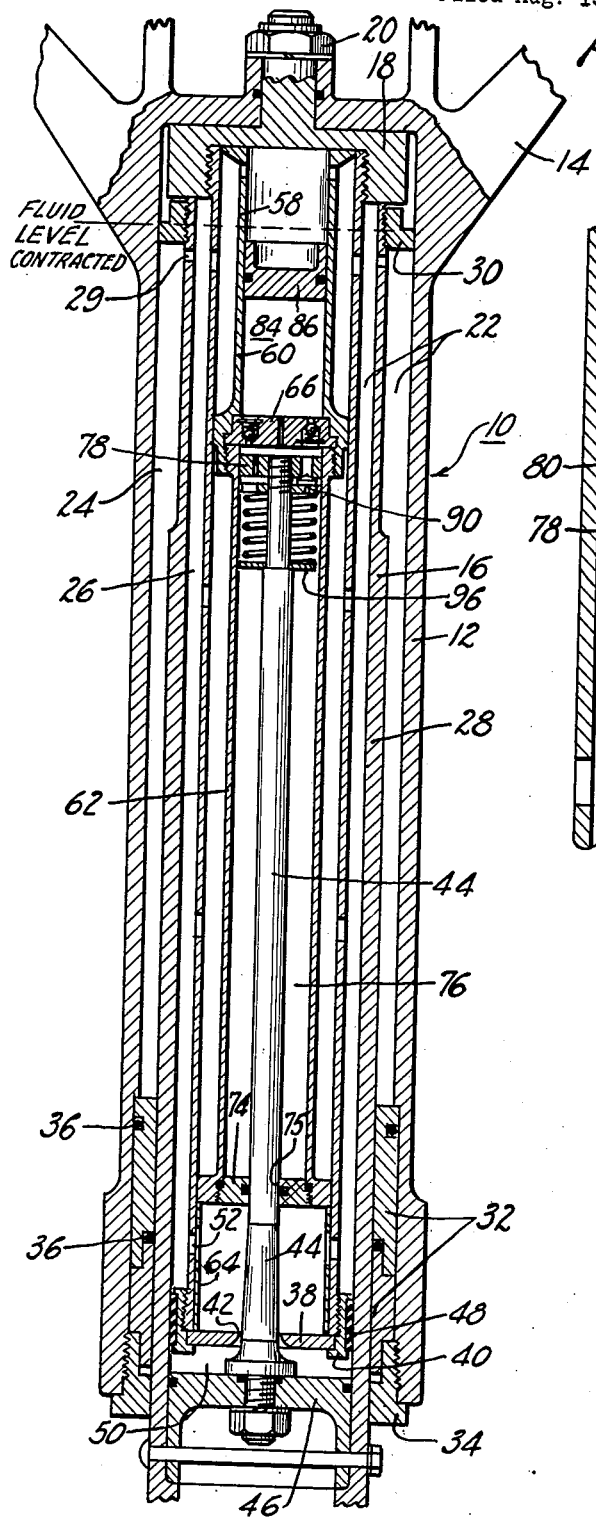
FIGURE 1 is a section view of a shock strut in accordance with the present invention.
Figure 2:
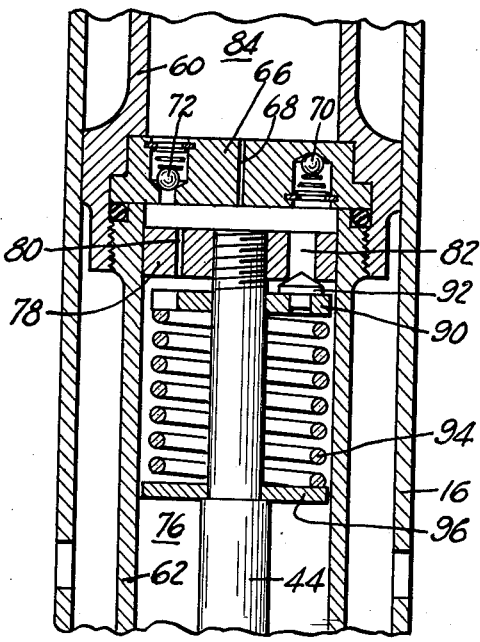
FIGURE 2 is an enlarged section view of a portion of FIGURE 1 providing a clearer illustration of the linear damper portion of our shock strut.

Referring to FIGURE 1, a shock strut, incorporating the novel principles of the present invention, is generally indicated by reference numeral 10, and includes an outer tubular casing 12 which normally is secured to an airframe by means of a bracket partially shown at 14. A second tubular member 16 contained concentrically within casing 12 is threadedly secured to a retainer 18 at its upper end which in turn is secured to the upper end of casing 12 by means of nut 20 such that the tubular members 12 and 16 are relatively fixed. The outer surface of tubular member 16 and the inner surface of tubular casing 12 define a hydraulic fluid containing annular chamber 22 which is further separated into two compartments 24 and 26 by a movable tubular member 28 which is telescoped between said fixed tubular members. An annular bushing 30 is threadedly secured to the upper end of movable tubular member 28 to provide sliding bearing support with the inner surface of casing 12. Ports 29 are provided in the side wall of tubular member 28 near bushing 30 to provide intercommunication between compartments 24 and 26. The lower end of casing 12 includes a pair of annular bushings 32 inserted in a stepped diameter portion and held in position by threaded cap 34. Bushings 32 include annular slots for receiving fluid seals 36. The second fixed tubular member 16 carries a diaphragm 38. A nut 40 is screwed onto the threaded end portion of tubular member 16 to clamp the diaphragm 38 into place. A metering orifice 42 is formed in the diaphragm 38 and a metering pin 44, which is operatively carried by movable tubular member 28 through the removable end plate 46, is movable through the metering orifice 42 to control the size of the orifice which is available for metering fluid therethrough. Nut 40 contains a fluid seal 48 mounted thereon which provides a fluid tight compartment 50 formed between diaphragm 38 and end plate 46. All fluid entering or leaving compartment 50 must pass through orifice 42. Fluid forced from chamber 50 passes through orifice 42 and through the additional openings 52 provided in the sidewall of tubular member 16 into chamber 22.

When the strut is fully compressed such as illustrated in FIGURE 1, the liquid level of the hydraulic fluid rises to the level indicated by the legend, approximately up to annular bushing 30. The remaining volume contains a compressible fluid medium such as air or the like.

The parts and structure described up to this point comprise a conventional aircraft shock strut of the variable metering orifice type primarily adapted for absorbing impact energy during aircraft landings. As the aircraft containing such a strut approaches a landing, the movable tubular member 28 is fully extended providing a maximum volume in compartment 50. As the aircraft wheels, which are secured in any well-known manner to the lower end of movable member 28, touch down and the aircraft load is transferred from the wings, rotor or other load supporting airfoil to the landing gear, tubular member 28 telescopes within members 12 and 16. The telescoping action forces fluid from compartment 50 to chamber 22 through orifice 42 at a rate permitted by metering pin 44 which may have a variable area along the portion of its length remaining below wall member 74 to achieve the most efficient load absorbing characteristic. As fluid is forced into and occupies the volume in chamber 22 the compressible fluid or air contained in said chamber is compressed. As the aircraft comes to rest and all its weight is supported by the landing gear, the full aircraft weight is in effect riding on a compressed column of air. Such action provides a highly efficient aircraft landing energy absorbing means, however, small cyclic vibrations or variations are not effectively countered since such a strut is primarily designed to meet large stroke high energy absorption conditions. The previously described phenomenon of ground resonance may induce cyclic vibrations which build up to a high magnitude in a shock strut designed to meet the landing conditions pointed out above. Accordingly, our invention comprises the utilization of linear damper means in combination with the above described variable metering orifice shock absorber to provide a shock strut that is not only capable of efficiently absorbing landing energy, but in addition effectively and efficiently dampens out small amplitude vibrations induced by conditions such as ground resonance. The structure comprising the resonance damper will now be described.

A hollow cylinder 58 comprised of two threadedly joined tubular sections 60 and 62 is positioned within the second fixed tubular member 16 at a position determined by spacing sleeve 64 inserted between the lower end of cylinder 58 and diaphragm 38. Cylinder 58 abuts at its upper end against retainer 18. At the threaded juncture of the tubular sections 60 and 62 a wall member 66 is retained and includes a small calibrated orifice 68 and two spring loaded check valves 70 and 72 which permit flow in opposite directions when the check valve spring loading force is overcome. A second wall member 74 is secured to the lower end of cylinder 62 and with the side walls of said cylinder and wall member 66 forms a chamber 76 which contains a column of hydraulic fluid. Wall member 74 has an opening 75 therein for receiving metering pin 44 in a fluid tight manner. A piston 78 is attached to the upper end of metering pin 44 and includes a fixed small bore calibrated passage 80 and a second large bore relief passage 82. The piston 78 operates in the column of fluid in chamber 76 and the damping force, required under short stroke high frequency cycling of the shock strut is provided by passing fluid from one side of piston 78 to the other through restrictive passage 80. The difference in fluid volume in chamber 76 due to the varying displacement of metering pin 44 is compensated for by allowing excess fluid from chamber 76, above piston 80, to pass through orifice 68 in wall 66 to a compensating chamber 84 formed in the upper tubular section 60. A movable piston or wall member 86 is provided in tubular section 60 to provide a separation barrier between the hydraulic fluid in chambers 84 and 76 and the compressible fluid or air in the uppermost section of the shock absorber. Hydraulic fluid entering chamber 84 thus forces piston 86 upwardly to compensate for the variation in fluid displacement in chamber 76 due to the entrance therein of metering pin 44. During the extension portion of the shock absorber cycle, the reverse action takes place and the excess fluid required is returned from chamber 84 to chamber 76 through orifice 68 by action of the air pressure on the top of floating piston 86. If desired, a spring member may also be employed to urge piston 86 downwardly to insure more positive positioning and reduce the probability of cavitation in chambers 76 and 84. Check valve 70 is provided in wall member 66 to further reduce the probability of cavitation and to permit rapid transfer of hydraulic fluid during long stroke rapid movements of metering pin 44.

A movable disc member 90 is slidably mounted on the upper end of metering pin 44 immediately below piston 66 and includes a valve member 92 secured thereto arranged to close large diameter passage 82. Disc 90 and valve 92 are urged upwardly in a direction to close passage 82 by force producing spring 94 concentrically mounted around metering pin 44 held in position by a fixed disc member 96 also secured to metering pin 44.

During normal long stroking of the shock absorber such as occurred in the previously described aircraft landing, sufficient pressure is built up in chamber 76, between piston 78 and wall 66, to unseat valve 92 against the action of spring 94, thus permitting rapid transfer of fluid in chamber 76 from above to below piston 78. The pressure built up between piston 78 and wall 66 is also high enough to unseat check valve 72 to allow for rapid compensation for displacement of metering pin 44. Shock absorbing characteristics under these conditions are controlled by metering pin 44 and orifice 42 configurations and are not materially affected by the resonance damper. After the aircraft has come to rest and piston 78 is not traversing chamber 76 rapidly, valve 92 closes, and piston 78 becomes operative as a damping agent, as only the relatively small restrictive passage 80 is operative to pass fluid to opposite sides of piston 78. During extension of the shock strut, for example after take off, fluid enters the chamber between piston 78 and wall 66 through passages 68 and 80. It has been found unnecessary for aircraft installations to provide means for permitting rapid shock absorber movement in the extending direction, although quite clearly the provision of such means is merely carrying forward the ideas disclosed herein and would be within the ambit of the ordinary mechanic.

Although only one embodiment of our invention has been disclosed, it should be understood that this is merely the preferred embodiment, and that other arrangements employing the novel aspects defined in the claims are within the scope of this invention.

We claim:

1. A shock strut comprising first and second relatively movable telescoping elements defining a variable volume fluid containing chamber, an orifice plate having a fluid control orifice formed therein movable with said first telescoping element and forming one side wall of said variable volume chamber, a metering pin contoured over a portion of its length secured to said second telescoping element and movable therewith, said metering pin arranged to extend through said fluid control orifice of said orifice plate to define a variable effective area control orifice, a cylinder member movable with said first telescoping element containing a confined column of hydraulic fluid coaxially arranged with said metering pin, said cylinder member having a fluid tight opening at one end for receiving said metering pin while preventing fluid transfer during the full operative range of shock strut movement, and a piston member secured to said metering pin within said cylinder member for movement therewith, said piston member having a relatively small diameter restrictive passage formed therethrough to permit fluid transfer from opposite sides of said piston with said cylinder member at a controlled rate.

2. A shock strut as claimed in claim 1 wherein said piston member includes a second relatively large diameter passage formed therethrough in parallel flow relationship with said relatively small diameter restricted passage to permit relatively unrestricted fluid transfer from opposite sides of said piston, pressure responsive spring loaded valve means for normally closing said large diameter passage, said valve means further operative to open said relatively large diameter passage under the influence of a hydraulic fluid pressure differential of a predetermined minimum value during the compression stroke of said telescoping elements.

3. A shock strut of the hydraulic-pneumatic type comprising first and second relatively movable telescoping elements defining a variable volume fluid containing chamber, fluid control means defining an orifice communicating with said variable volume chamber movable with said first telescoping element, an elongated metering pin extending through said orifice for controlling the effective flow controlling area thereof movable with said second telescoping element, a hollow cylindrical member containing a column of hydraulic fluid arranged within and movable with said first telescoping element in coaxial alignment with said metering pin, said cylindrical member including a first fixed wall member and a second fixed wall member disposed in said cylinder to define a fixed volume fluid containing compartment in cooperation therebetween said first fixed wall member having an opening formed therein for receiving said metering pin therethrough so that one end of said metering pin is reciprocable in said fixed volume compartment, and a piston member secured to said metering pin within said fixed volume compartment, said piston member including a first restrictive fluid permitting passage formed therethrough for damping the movement of said piston and metering pin members.

4. A shock strut as claimed in claim 3 wherein said piston member includes a relatively large relief passage formed therein, valve means operative with said relief passage to control the hydraulic fluid flow therethrough, spring means operative to bias said valve means in a passage closing position, said valve means being operative to open against the action of said spring means when the pressure differential across said piston exceeds a predetermined value.

References Cited in the file of this patent

UNITED STATES PATENTS

| | | |
|---|---|---|
| 2,171,827 | Elliott | Sept. 5, 1939 |
| 2,348,160 | Thornhill | May 2, 1944 |
| 2,626,685 | Brundrett | Jan. 27, 1953 |
| 2,774,446 | Carbon | Dec. 18, 1956 |
| 2,815,099 | Muller et al. | Dec. 3, 1957 |
| 2,886,142 | Orshansky | May 12, 1959 |